(12) United States Patent
Boule et al.

(10) Patent No.: US 10,176,251 B2
(45) Date of Patent: Jan. 8, 2019

(54) SYSTEMS AND METHODS FOR IDENTIFYING SIMILARITIES USING UNSTRUCTURED TEXT ANALYSIS

(71) Applicant: Raytheon Company, Waltham, MA (US)

(72) Inventors: Blaine K. Boule, Vail, AZ (US); Nicholas Wayne Barrett, Oro Valley, AZ (US)

(73) Assignee: Raytheon Company, Waltham, MA (US)

( * ) Notice: Subject to any disclaimer, the term of this patent is extended or adjusted under 35 U.S.C. 154(b) by 436 days.

(21) Appl. No.: 14/840,192

(22) Filed: Aug. 31, 2015

(65) Prior Publication Data

US 2017/0060995 A1    Mar. 2, 2017

(51) Int. Cl.
*G06F 17/30* (2006.01)

(52) U.S. Cl.
CPC .. *G06F 17/30684* (2013.01); *G06F 17/30696* (2013.01)

(58) Field of Classification Search
CPC .............. G06F 17/30684; G06F 17/30696
USPC ........................................ 707/728
See application file for complete search history.

(56) References Cited

U.S. PATENT DOCUMENTS

| | | | |
|---|---|---|---|
| 8,140,559 B2 | 3/2012 | Bobick et al. | |
| 8,224,851 B2* | 7/2012 | Banda | G06F 17/30997 707/781 |
| 8,402,030 B1* | 3/2013 | Pyle | G06F 17/30675 707/738 |
| 8,538,965 B1* | 9/2013 | Talyansky | G06F 17/30126 707/736 |
| 8,654,942 B1* | 2/2014 | Garrett | H04L 12/1831 348/14.08 |
| 8,849,785 B1* | 9/2014 | Shattuck | G06F 17/30864 707/706 |
| 8,849,843 B1* | 9/2014 | George | G06F 17/30908 707/758 |
| 9,141,694 B2* | 9/2015 | Lamere | G06F 17/30749 |

(Continued)

OTHER PUBLICATIONS

"Solr Relevancy FAQ—Solr Wiki", [Online]. Retrieved from the Internet: <URL:https://wiki.apache.org/solr/SolrRelevancyFAQ?action=print>, (Accessed Feb. 13, 2018), 6 pgs.

*Primary Examiner* — Phuong Thao Cao
(74) *Attorney, Agent, or Firm* — Schwegman Lundberg & Woessner, P.A.

(57) ABSTRACT

Generally discussed herein are systems, devices, and methods for unstructured text analysis. A method can include deconstructing structured data to create unstructured text, creating a first word cloud using the unstructured text, creating a query based on the first word cloud, receiving data corresponding to contents of a specified number of records determined to include data most similar to the first word cloud in a database of records, creating a second word cloud for each of the specified number of records using the data from the specified number of records, determining similarity values indicating how similar the first word cloud is to each of the second word clouds, and providing a similarity indicator for each record of the specified number of records to a user interface, the similarity indicator representing a relative magnitude of the determined similarity values of the specified number of records.

18 Claims, 4 Drawing Sheets

(56) References Cited

U.S. PATENT DOCUMENTS

| | | |
|---|---|---|
| 9,258,264 B1* | 2/2016 | Shoham .................. H04L 51/32 |
| 9,846,740 B2* | 12/2017 | Bamford ........... G06F 17/30675 |
| 2005/0027485 A1* | 2/2005 | Zetko-White .......... G06Q 10/10 702/185 |
| 2008/0092044 A1* | 4/2008 | Lewis ............... G06F 17/30722 715/713 |
| 2008/0114737 A1* | 5/2008 | Neely .................. G06Q 10/107 |
| 2008/0168135 A1* | 7/2008 | Redlich .................. G06Q 10/10 709/204 |
| 2009/0106224 A1 | 4/2009 | Roulland et al. |
| 2009/0177957 A1* | 7/2009 | Bouillet ..................... G06F 8/30 715/230 |
| 2009/0182727 A1* | 7/2009 | Majko ............ G06F 17/30554 |
| 2009/0204493 A1* | 8/2009 | Kim ........................ G06Q 30/02 705/14.56 |
| 2009/0222551 A1* | 9/2009 | Neely ............... G06F 17/30864 709/224 |
| 2009/0240647 A1* | 9/2009 | Green .................... G06N 7/005 706/52 |
| 2009/0287989 A1* | 11/2009 | Chakra ............. G06F 17/30867 715/205 |
| 2009/0327120 A1* | 12/2009 | Eze ........................ G06Q 40/00 705/38 |
| 2010/0114789 A1* | 5/2010 | Dane ...................... G06Q 10/06 705/321 |
| 2010/0131899 A1* | 5/2010 | Hubert ............. G06F 17/30896 715/823 |
| 2010/0161619 A1* | 6/2010 | Lamere .............. G06F 17/3089 707/749 |
| 2010/0161620 A1* | 6/2010 | Lamere ........... G06F 17/30749 707/749 |
| 2010/0280904 A1* | 11/2010 | Ahuja .................... G06Q 30/02 705/14.58 |
| 2011/0035403 A1* | 2/2011 | Ismalon .............. G06F 17/3064 707/769 |
| 2011/0040562 A1* | 2/2011 | Doyle .................. G11B 27/322 704/251 |
| 2011/0191364 A1 | 8/2011 | LeBeau et al. |
| 2011/0267419 A1* | 11/2011 | Quinn ...................... H04N 7/15 348/14.08 |
| 2011/0307819 A1* | 12/2011 | Vadlamani ........ G06F 17/30696 715/771 |
| 2012/0047534 A1* | 2/2012 | Gharachorloo .......... H04N 5/76 725/53 |
| 2012/0072261 A1* | 3/2012 | Oberoi ............... G06Q 30/0203 705/7.32 |
| 2012/0084149 A1* | 4/2012 | Gaudiano .......... G06Q 30/0256 705/14.54 |
| 2012/0179465 A1* | 7/2012 | Cox ..................... H04L 12/1822 704/235 |
| 2012/0246137 A1* | 9/2012 | Sallakonda ....... G06F 17/30056 707/709 |
| 2012/0303637 A1* | 11/2012 | Carmel ............... G06F 17/241 707/749 |
| 2013/0173533 A1* | 7/2013 | Nichols ............. G06F 17/30035 707/609 |
| 2013/0179806 A1* | 7/2013 | Bastide ............... G06F 3/04817 715/760 |
| 2013/0185336 A1* | 7/2013 | Singh ................ G06F 17/30654 707/794 |
| 2013/0212087 A1* | 8/2013 | Chitiveli .......... G06F 17/30991 707/722 |
| 2013/0254184 A1* | 9/2013 | Ellsworth ......... G06F 17/30038 707/722 |
| 2013/0332450 A1* | 12/2013 | Castelli ................. G06F 17/278 707/722 |
| 2014/0063556 A1* | 3/2014 | Park ...................... G06F 17/214 358/1.18 |
| 2014/0195950 A1* | 7/2014 | Diament ........... G06F 17/30958 715/771 |
| 2014/0282244 A1* | 9/2014 | Speer .................. G06F 3/04842 715/811 |
| 2014/0289213 A1* | 9/2014 | Delano ............. G06F 17/30696 707/706 |
| 2014/0310062 A1* | 10/2014 | Klein ................. G06Q 30/0203 705/7.32 |
| 2014/0330770 A1* | 11/2014 | Yerli .................. G06F 17/30867 707/609 |
| 2015/0019569 A1* | 1/2015 | Parker ............... G06F 17/30572 707/748 |
| 2015/0026192 A1* | 1/2015 | Kamerman ....... G06F 17/30699 707/748 |
| 2015/0071427 A1* | 3/2015 | Kelley ............... G06Q 30/0202 379/265.09 |
| 2015/0100578 A1* | 4/2015 | Rosen ............... G06F 17/30598 707/737 |
| 2015/0120717 A1* | 4/2015 | Kim .................. G06F 17/30699 707/727 |
| 2015/0206156 A1* | 7/2015 | Tryfon ............... G06Q 30/0203 705/7.32 |
| 2015/0213512 A1* | 7/2015 | Spievak ............. G06Q 30/0275 705/14.71 |
| 2015/0248429 A1* | 9/2015 | Pregueiro ............. G06F 17/212 715/202 |
| 2015/0347558 A1* | 12/2015 | Blaas ................. G06F 17/3053 707/738 |
| 2015/0347571 A1* | 12/2015 | Blaas ................ G06F 17/30973 707/722 |
| 2015/0356171 A1* | 12/2015 | Sheinfeld ........... G06F 17/3071 707/738 |
| 2016/0005197 A1* | 1/2016 | Walker .................. G06T 11/206 345/440 |
| 2016/0012106 A1* | 1/2016 | Franceschini ..... G06F 17/30424 707/728 |
| 2016/0012126 A1* | 1/2016 | Franceschini ..... G06F 17/30628 707/735 |
| 2016/0070762 A1* | 3/2016 | Nicholls ........... G06F 17/30864 707/722 |
| 2016/0085853 A1* | 3/2016 | Zelevinsky ....... G06F 17/30672 707/765 |
| 2016/0162582 A1* | 6/2016 | Chatterjee ......... G06F 17/30867 707/706 |
| 2016/0224940 A1* | 8/2016 | Fulton ................ G06Q 10/1053 |
| 2016/0299955 A1* | 10/2016 | Jain .................... G06F 17/30716 |
| 2016/0364460 A1* | 12/2016 | Shuster ................ G06F 3/04842 |
| 2017/0004184 A1* | 1/2017 | Jain ..................... G06F 17/2735 |
| 2017/0060995 A1* | 3/2017 | Boule ................ G06F 17/30684 |

* cited by examiner

SYSTEMS AND METHODS FOR IDENTIFYING SIMILARITIES USING UNSTRUCTURED TEXT ANALYSIS

TECHNICAL FIELD

Embodiments discussed herein generally relate to determining similarities in unstructured text. One or more embodiments relate more specifically to comparing word clouds to determine a likelihood that the subject matter of a document is related to data received from a user interface.

BACKGROUND

In quality management systems, users submit a record representing a description and documentation of an issue (e.g., a defect, and/or failure) discovered during a product lifecycle. The issue can be with the product itself or manufacturing equipment associated with the product. Frequently, users (same or different users) submit multiple records for similar issues without being aware of previous records having been identified. This is a costly problem because many systemic issues are treated as "one-time", unrelated problems, instead of being identified as patterns. Users are not aware of trends, similar problems, or simultaneous efforts to resolve like issues. Currently, quality analysts rely on keyword or identifier searches, domain knowledge, and other unreliable and error-prone techniques to find similar issues and often misidentifying larger systemic problems and trends.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Embodiments in this disclosure generally relate to determining similarities in unstructured text. Subject matter discussed herein provides a means for comparing and pinpointing "like" issues within a system, such as a quality management system, and presenting issues determined to be similar to each other as suggested similar problems.

In quality management or other issue identification systems users submit records representing issues (e.g., defects or failures discovered during a product lifecycle). In such systems there is a gap between incident investigations, such as can include identifying and reporting a newly discovered issue, and identifying common failure modes (i.e. determining if a same or similar problem has been discovered or addressed). Frequently, users submit multiple records for similar or the same issues without being aware that a previous record of the same or a similar issue has been submitted previously. Systems, devices, and methods discussed herein can provide real-time or near real-time textual analysis of data within records, such as records that detail an issue (e.g., a manufacturing or other problem, a product defect, a solution to the problem or product defect, and combinations thereof). The subject matter performs an analysis on free-text fields (e.g., unstructured text).

While a user is entering a new problem description, such as by filling in a form with pre-defined prompts, the system or methods perform analysis on text entered, create a word cloud based on the entered text, and process the word cloud to create a weighted query. The word cloud includes a representation of the text with a weight-sorted list of "tags" that includes the words determined within the record that are determined to be important. The importance of the word can be determined based on the words frequency or uniqueness, among other importance indicators. The weighted terms are used to query a search platform (e.g., Apache SOLR) and find the identifier keys and class types of records that include same or similar words as the words in the query.

The data records queried may be of various types and detail, number of words, and other attributes. The records are pre-filtered based on the query and those that are not filtered out are then deconstructed into a set of text and another word cloud is produced based on the deconstructed text. The two word clouds are compared, such by using a technique described in U.S. Pat. No. 8,402,030, which is incorporated herein by reference in its entirety. The comparison determines how similar the returned record is to the text entered (or being entered) by the user. The relationship score between each pre-filtered result is represented by a similarity indicator, such as a 1-5 star rating, a number, a symbol, or other indicator. Such a system can provide the user entering a problem description real-time awareness of "like" issues that are currently issues or issues that have previously been identified and possibly resolved. This capability may eliminate the need to even save a first copy of the form if a system-suggested and user-verified similar issue is been confirmed.

Figure 1:
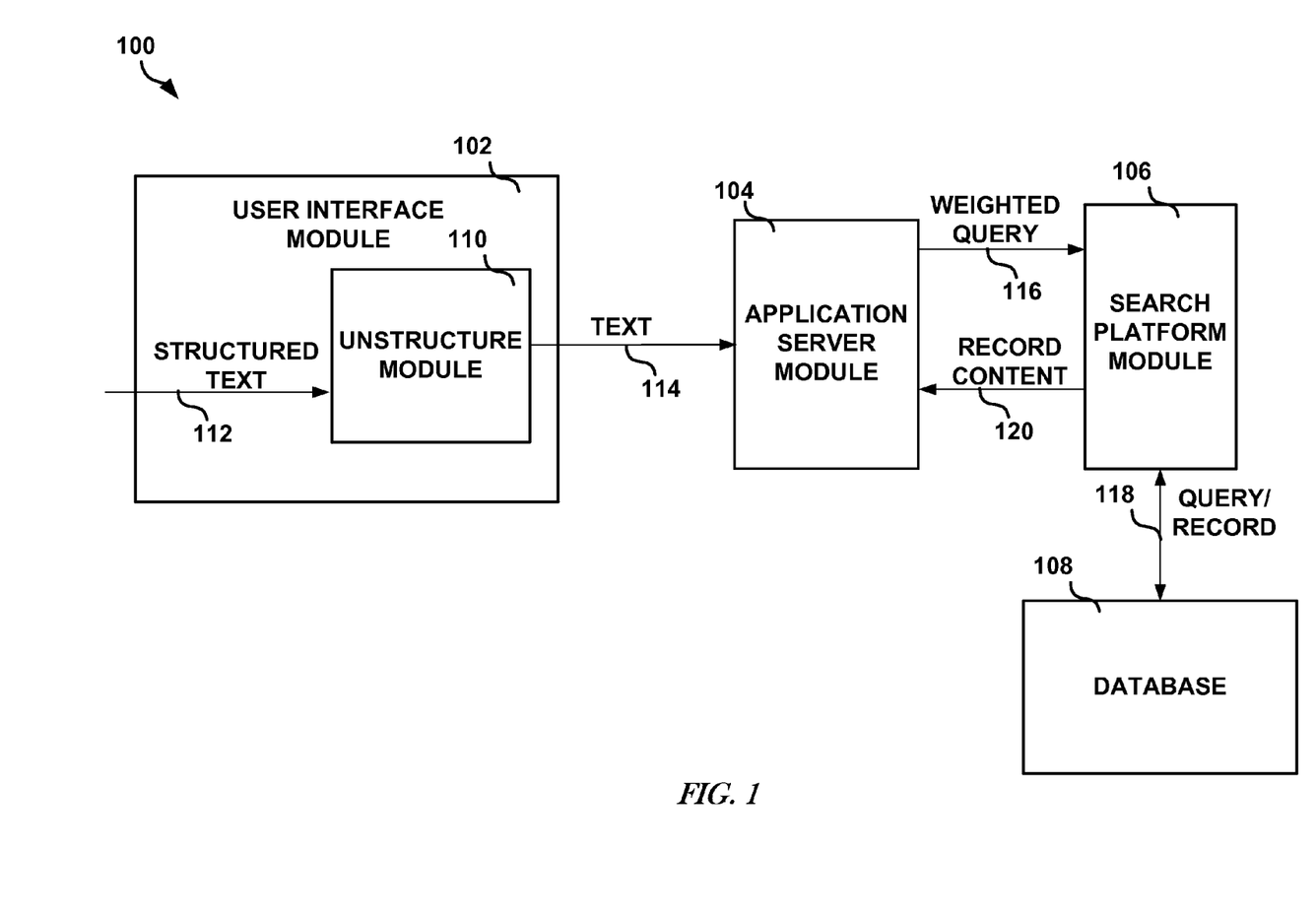
FIG. 1 illustrates, by way of example, a block diagram of an embodiment of a system for performing unstructured text analysis.

FIG. 1 illustrates, by way of example, a block diagram of an embodiment of a system 100 for performing unstructured text analysis. The system 100 as illustrated includes a user interface module 102, an application server module 104, a search platform module 106, and a database 108. The user interface module 102 is communicatively coupled to the application server module 104. The application server module 104 is communicatively coupled between the user interface module 102 and a search platform module 106. The search platform module 106 is communicatively coupled between the application server module 104 and the database 108.

The user interface module 102 can include a web browser or a client application. The user interface module 102 can be accessed by a user interacting with one or more graphical objects (e.g., prompts or input boxes) presented over an audio or visual display using a keyboard, mouse, touchscreen, voice command, modulus, or other input device. The user interface module 102 presents a user with a view of a record that allows a user to fill in predefined fields with data describing an issue encountered in a product lifecycle (e.g., a product defect, a manufacturing error, a part defect, customer complaint, resolution of the issue, or the like).

Figure 2:
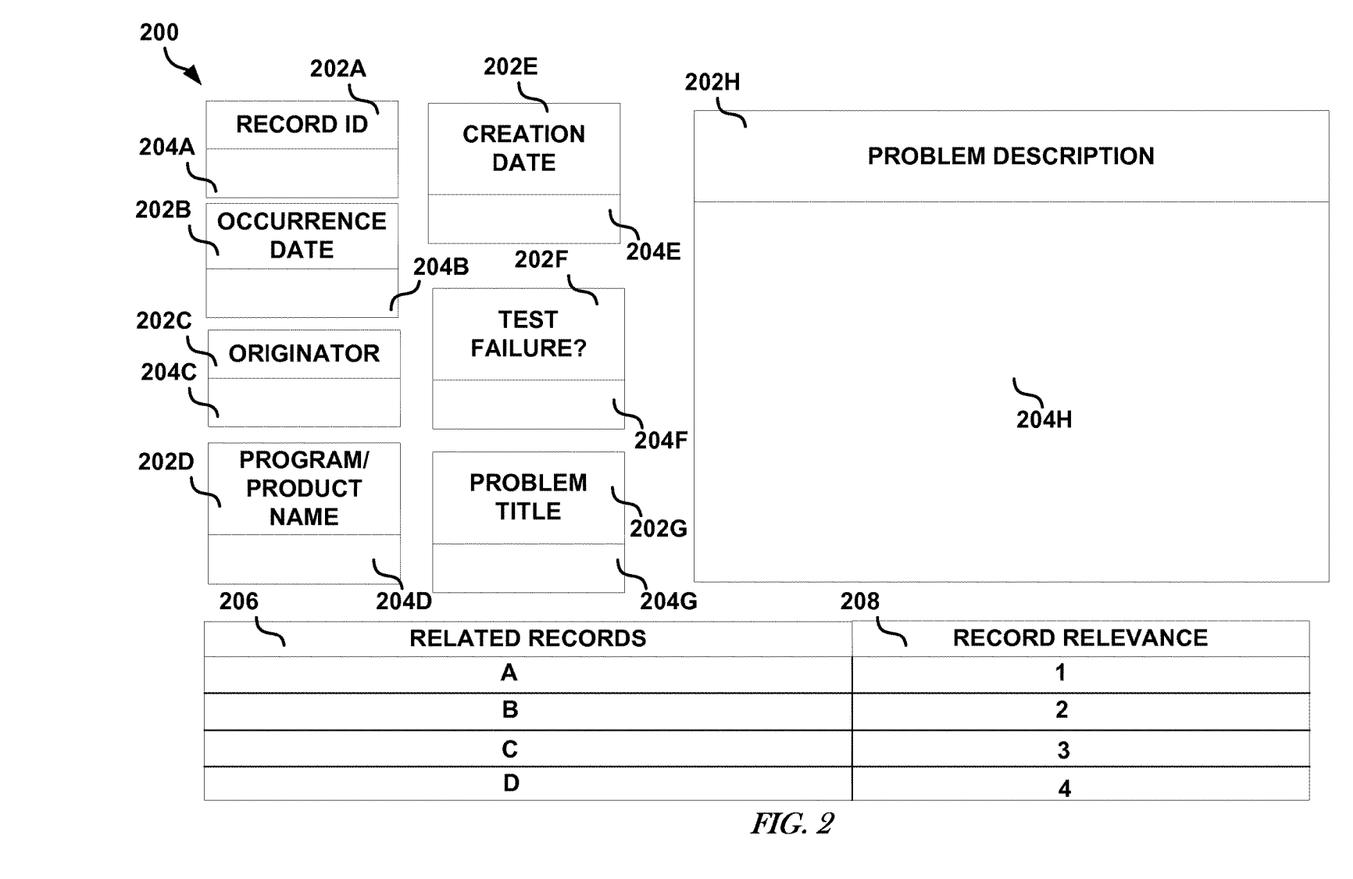
FIG. 2 illustrates, by way of example, an embodiment of a user interface to facilitate a user filling out a record.

Such a view of a user interface 200 through which a user can fill out a record is presented, as an example, in FIG. 2. The user interface module 102 receives structured text 112 as an input and produces unstructured text 114 as an output.

The example user interface 200 presented in FIG. 2 includes a plurality of prompts 202A, 202B, 202C, 202D, 202E, 202F, 202G, and 202H. For each prompt 202A-H there is a corresponding input box 204A, 204B, 204C, 204D, 204E, 204F, 204G, and 204H, respectively, in which a user can enter a response to the prompt 202A-H. The user's response entered into each input box 204A-H is provided to an unstructure module 110 in the form of structured data. Structured data is data that includes descriptive metadata or other tags that describe what the data is, where the data originated, or the like. An example of a structured data includes Extensible Markup Language (XML) data that includes both markup and content and Hypertext Markup Language (HTML). The markup provides a description of the content. The unstructure module 110 takes structured data as an input and produces unstructured data (e.g., unstructured text) based on the structured data. The unstructure module 110 performs this operation by understanding the format in which the data is received and either removing the metadata or extracting only the content from the structured data. In one or more embodiments, only the unstructured data is provided to the application server module 104.

The application server module 104 receives the unstructured text 114 and determines a word cloud based on the words in the unstructured data. A word cloud (sometimes referred to as a tag cloud) is a representation of word importance based on one or more specified parameters. The parameters can include frequency of the word in the received unstructured data (e.g., the greater the words frequency a greater weight or importance can be placed on the term), an inverse frequency (e.g., the fewer times the word appears the greater the weight that is placed on the word), and/or a word boost that can be specified by a user. For example, a user can specify that a part number gets more weight than other words in the word cloud.

The user interface module 102 can provide the unstructured data to the application server module 104 as the user enters the data into the field (e.g., in real time), can provide the unstructured data to the application server module 104 in response to a user clicking out of the input box 204A-H in which they have entered a response to the corresponding prompt 202A-H, the user selecting another input box 204A-H, or the user selecting a "Submit" control or otherwise indicating that the text is to be provided to the application server 104. In one or more embodiments, the unstructured text can be provided to the application server module 104 automatically. In one or more embodiments, the application server module 104 updates the word cloud in response to receiving additional text. In one or more embodiments, the application server module 104 updates the word cloud in response to receiving at least a specified number of characters.

The application server module 104 constructs a query 116 (e.g., a weighted query) from the word cloud. A weighted query is a query with terms weighted in the query, such as to emphasize the one or more words in the query over other words of the query. The words in the query can be weighted relative to the weight they received in the word cloud. For example, a word that appears more times than another word in the unstructured data can be given a relatively higher weight than the word that appears fewer times in the unstructured data. In another example, a word that appears only once (a sort of inverse term frequency boost) or in a field of the report that is deemed to include more important information can be given a higher weight relative to a word that appears more times or in a field of lesser importance.

The query created by the application server module 104 can include an Apache Solr query or another query format, such as a Structured Query Language (SQL), HTSQL (a query language that translates a Hypertext Transfer Protocol (HTTP) query to SQL), or other information retrieval query language. The query can be created automatically (i.e. without human interference after deployment).

The query is provided to a search platform module 106. The search platform module 106 can include Apache Solr from Apache Software Foundation of Delaware, United States or other search platform. The search platform module 106 executes a received query 118 on the database 108. The database 108 includes records previously filled out by users, such as by using the user interface 102. The search platform module 106 returns content 120 a specified number of records from the database 108, to the application server module 104, determined to best match the search query created by the application server 104.

The application server module 104 creates word clouds based on words of each record received from the database 108. The word cloud is created in the same manner that was used to create the word cloud from the unstructured text received from the unstructure module 110. The application server module 104 compares the two created word clouds, such as to determine a similarity score between the two word clouds. A process for comparing the two word clouds is discussed in U.S. Pat. No. 8,402,030. A specified number of records that are determined to include content that is most related to the unstructured text (i.e. the records that are determined to have the highest score based on the comparison of corresponding word clouds) are listed along with a corresponding similarity indicator using the user interface module 102.

The comparison of the word clouds can include creating a frequency distribution for words in each of the records returned and the unstructured text received. The comparison can further include determining an intersection between words in the frequency distribution of a record returned (for each record returned) and the unstructured text received. For each word in the intersection, the frequency with which each word appears in the corresponding record and the frequency with which the word appears in the unstructured text is determined. These frequencies are previously determined in the creation of the word cloud. The lower frequency of the two determined frequencies is selected. The similarity measure is determined as a function of one or more of a count of the number of words in the intersection, a count of the words in the record, the selected lower frequency (ies), and the frequency distribution of the words in the record. In one or more embodiments, the similarity measure is returned as a number between (e.g., and including) [0, 1]. Other numerical distributions can be used. In one or more embodiments, a higher number that is returned indicates a stronger relation between the word clouds created (i.e. the words in the unstructured text and the words in the returned record). In other embodiments, a lower relative number indicates a stronger relation between the word clouds.

While FIG. 1 illustrates the unstructure module 110 as part of the user interface module 102, the unstructure module 110 can be a part of the application server module 104. In one or more embodiments, the application server module 104 and the search platform module 106 can be hosted on the same server, such as a virtual machine, or different servers. The database 108 can be any type of database that stores and indexes records in a manner that is searchable, such as by executing a query, by the search platform module 106.

FIG. 2 illustrates, by way of example, an embodiment of a user interface 200 to facilitate a user filling out a record that details an issue encountered in a product lifecycle. The user interface 200 includes a list of related records 206 and an indication of the record relevance 208 for each related record 206. The related records 206 list includes details of the record title, record type, or other record metadata. The record relevance 208 includes a corresponding indicator of the determined similarity score between the word cloud of the respective returned record in the related records 206 and the word cloud created using the unstructured text entered in the input box 204A-H. In one or more embodiments, the record relevance 208 is updated in real time (without an appreciable (e.g., detectable) lag, to the user, between typing in the input box 204A-H and updating the related records 206 and the record relevance 208 lists). In one or more embodiments, the lag is appreciable and the update to the related records 206 and the record relevance 208 happens in near real time or the update only happens after a user initiates the update, such as by selecting a control that provides a signal to the application server module 104 that initiates the process of determining records that might include subject matter related to subject matter being entered by the user in the user interface 102.

Figure 3:
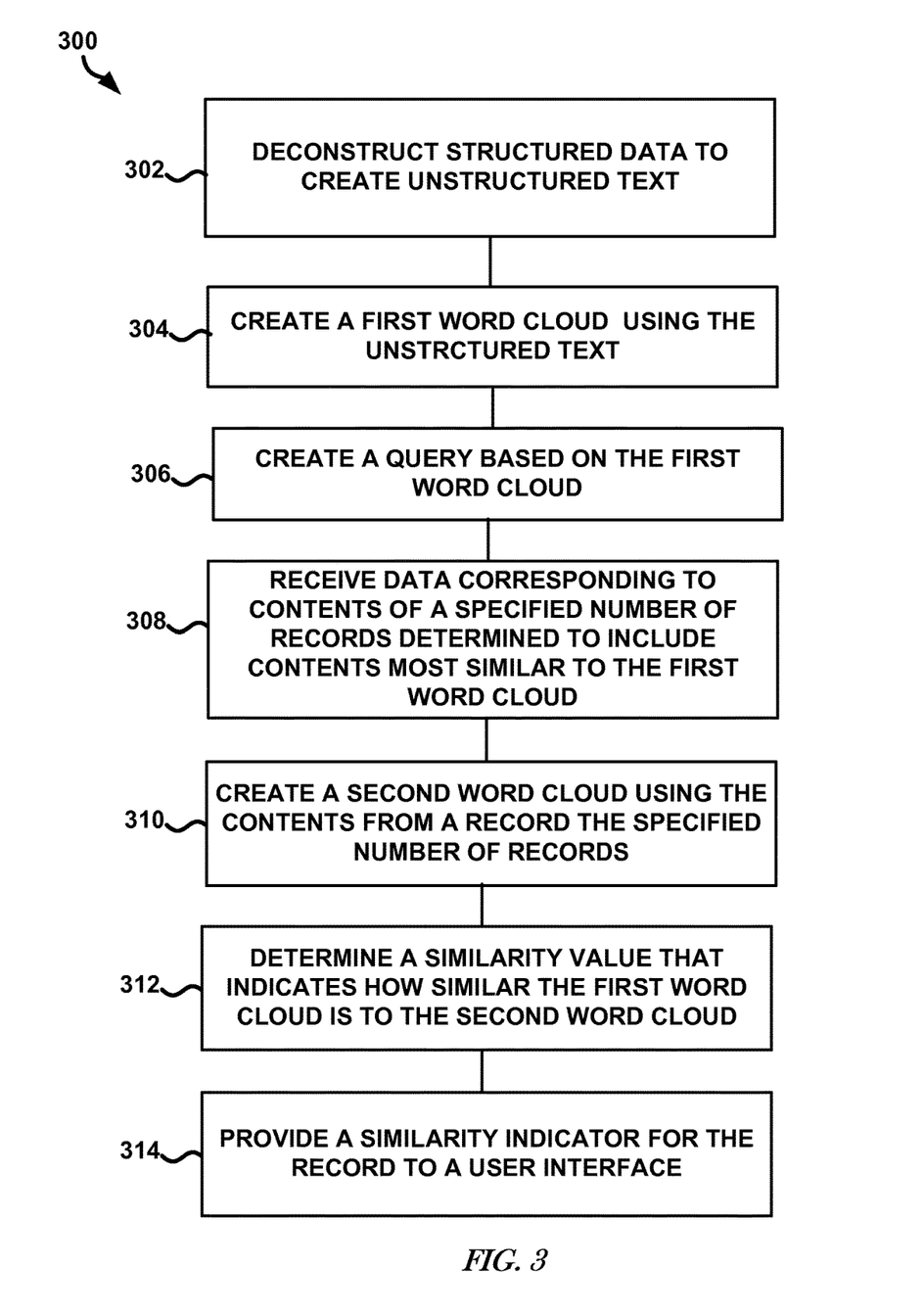
FIG. 3 illustrates, by way of example, a diagram of an embodiment of a method for determining (e.g., in real time or near real time) records of a set of records are most likely to be associated with subject matter being reported through a user interface.

FIG. 3 illustrates, by way of example, a diagram of an embodiment of a method 300 for determining (e.g., in real time or near real time) records of a set of records that are most likely to be associated with subject matter being reported through a user interface. The method 300 as illustrated includes deconstructing structured data to create unstructured text at operation 302; creating a first word cloud using the unstructured text at operation 304; creating a query based on the first word cloud at operation 306; receiving data corresponding to contents of a specified number of records determined to include contents most similar to the first word cloud at operation 308; creating a second word cloud using data corresponding to a record of the specified number of records at operation 310; and providing a similarity indicator for each record to a user interface at operation 312. The operation 302 can be performed using the unstructured module 110.

An example of the operation 302 is provided. Consider the following, structured Hypertext Markup Language (HTML) data that is submitted in response to a user typing "Lack of adhesive caused leakage" into the "Problem Description" field (input box 204H) of the user interface 200:

```
<html>
<head>
<title>Problem Description</title>
</head>
<body>
<p>Lack of adhesive caused leakage</p>
</body>
</html>
```

Deconstructing the structured data to create unstructured text can include extracting only the content of the HTML element and not the tag, attribute, or other markup associated with the element. In this manner, only the text entered by the user is used to create the first word cloud. Other text in the elements of the structured data can be used to, for example, boost one or more words in the query. For example, one or more words from structured data that includes a specified title can be boosted greater than one or more words from structured data that does not include the specified title. In this manner a user can specify the relative importance of the data entered into the input box 204A-H.

The operations 304, 306, 308, 310, and 312 can be performed by the application server module 104. The structured data can include a user's respective responses to predefined prompts, and the unstructured text consists of one or more of the respective responses. The method 300 can further include receiving, such as at a user interface communicatively coupled to the application server, a response to a predefined prompt in response to a user completing the response, wherein the unstructured text includes text representative of the response. The method 300 can further include updating the first word cloud based on the received response. The method 300 can further include updating the query based on the first updated word cloud. The method can further include executing the updated query. The method 300 can further include providing data from second records in the database determined to include data most similar to the updated first word cloud based on the executed updated query. The method 300 can further include creating an updated second word cloud using the data from the second records. The method 300 can further include determining a similarity value indicating how similar the updated first word cloud is to the updated second word cloud. The method 300 can further include providing an updated similarity indicator to the user interface that indicates how similar a particular record of the second records is to the text received at the user interface.

The method 300 can further include determining a score for each record returned from the query and providing the specified number of records determined to include highest relative scores. The method can further include setting a query clause boost factor associated with a word in the query based on a relative value of the term frequency tag to values of term frequency tags associated with other words in the first word cloud.

Figure 4:
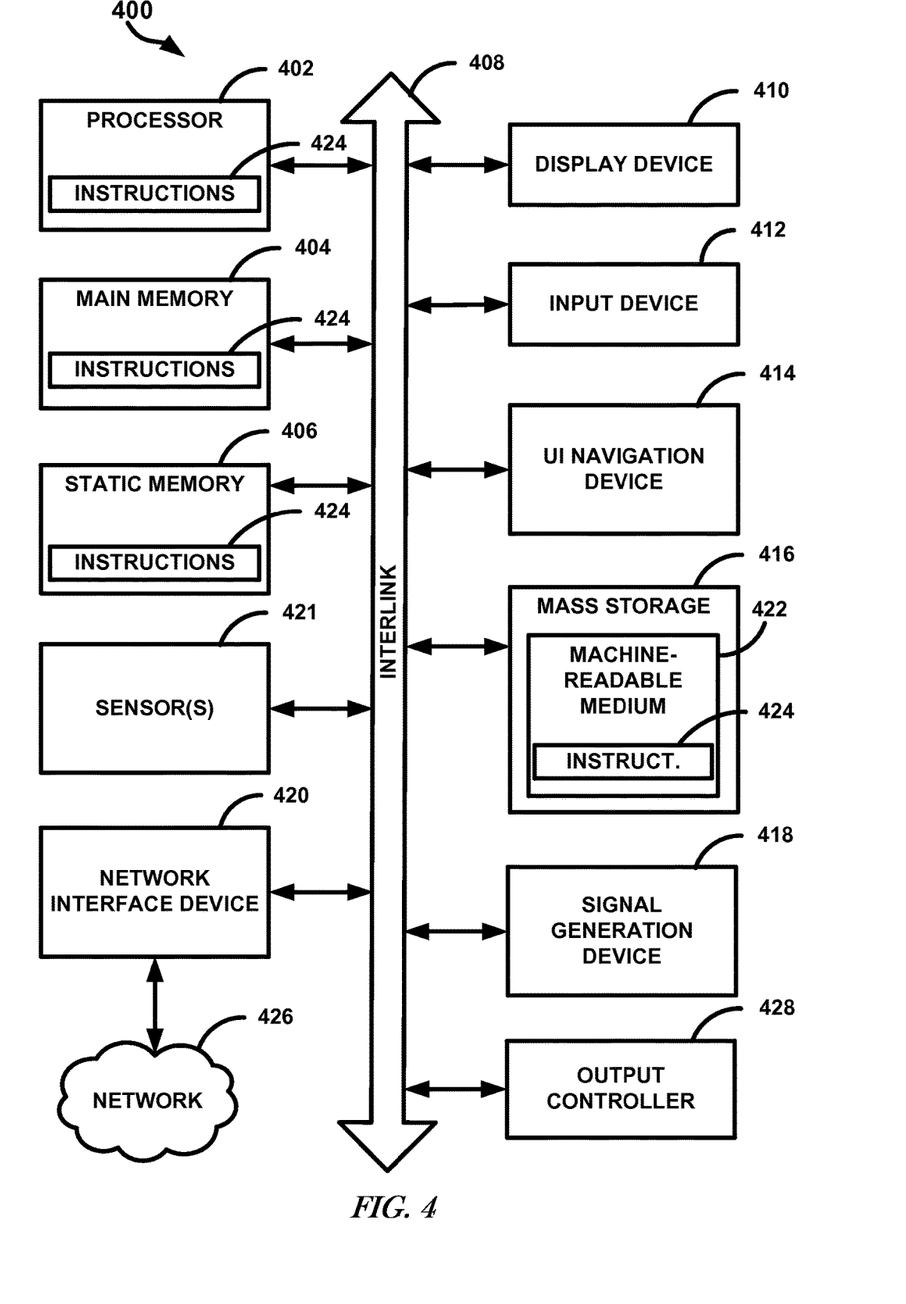
FIG. 4 illustrates, by way of example, a block diagram of an embodiment of a machine on which one or more of the methods as discussed herein can be implemented.

FIG. 4 illustrates, by way of example, a block diagram of an embodiment of a machine 400 on which one or more of the methods as discussed herein can be implemented. The machine 400 can include a computing device instantiated as a compute device or server. The machine 400 may be employed to host hardware, software, and/or firmware that provides a user (e.g., in real time, near real time, or on demand) with an indication of whether a report was previously submitted regarding a same or similar issue that is being or has been reported by the user. One or more of the user interface module 102, unstructure module 110, application server module 104, search platform module 106, and/or the database 108 can include one or more of the items of the machine 400. In one or more embodiments, the user interface module 102, unstructure module 110, application server module 104, search platform module 106, and/or the database 108 can be implemented by the machine 400. In alternative embodiments, the machine 400 operates as a standalone device or may be connected (e.g., networked) to other machines. In a networked deployment, the machine 400 may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example machine 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The machine 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software) 424 embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media.

While the machine-readable medium 422 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 424 may further be transmitted or received over a communications network 426 using a transmission medium. The instructions 424 may be transmitted using the network interface device 420 and any one of a number of transfer protocols (e.g., File Transfer over TCP/IP, UDP, etc.). Examples of communication networks include a local area network ("LAN") and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

The system(s), apparatus(es), and method(s) can be implemented in one or more modules that can be implemented on a computing device as a standalone, add-on, or plug-in for another application, among other implementations. Embodiments, as described herein, can include, or can operate on logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, logic gates (e.g., combinational and/or state logic), circuits, etc.) and a machine readable medium containing instructions, where the instructions configure the execution units to carry out a specific operation when in operation. The configuring can occur under the direction of the executions units or a loading mechanism. Accordingly, the execution units (e.g., processing circuitry, such as can include one or more hardware processors, transistors, resistors, capacitors, inductors, state machines or other logic gates, multiplexers, radios, sensors or other electrical or electronic components) can be communicative coupled to the machine readable medium when the device is operating. In this example, the execution units can be a user (e.g., personnel) of more than one module. For example, under operation, the execution units can be configured by a first set of instructions to implement a first module at one point in time and reconfigured by a second set of instructions to implement a second module. The system 100 as illustrated includes a plurality of separate modules. The modules can be implemented with the division of operations as explained herein or the division of operations can be different such that a single module implements one or more of the operations of two or more of the modules or multiple modules implement the operations of one of the illustrated modules.

EXAMPLES AND ADDITIONAL NOTES

Example 1 can include or use subject matter (such as an apparatus, a method, a means for performing operations, or a machine readable memory including instructions that, when performed by the machine, can configure the machine to perform acts), such as can include or use processing circuitry communicatively coupled to a memory, the memory including instructions stored thereon which, when executed by the processor, cause the processing circuitry to implement modules comprising a user interface module to receive structured data and deconstruct the structured data to create unstructured text, an application server module to receive the unstructured text, create a first word cloud using the unstructured text, and create a query based on the first word cloud, a search platform module to execute the query on a database and provide data from a specified number of records determined to include data most similar to the first word cloud based on the query, and wherein the application server module is further to create a plurality of second word clouds, one second word cloud for each of the specified number of records, determine a similarity value indicating how similar the first word cloud is to each of the second word clouds, and provide a similarity indicator to the user interface that indicates how similar a particular record of the specified number of records is to the text received at the user interface based on the determined similarity value.

Example 2 can include or use, or can optionally be combined with the subject matter of Example 1, to include or use, wherein the user interface module provides a user a view of a first record to be populated using a user's respective responses to predefined prompts, the unstructured text consists of one or more entered respective responses, and the records include records previously populated using the user interface module.

Example 3 can include or use, or can optionally be combined with the subject matter of Example 2, to include or use, wherein the user interface module is to deconstruct the structured data in response to the user completing a response to a predefined prompt and provide the unstructured data in response to deconstructing the structured data, the application server module is further to update the first word cloud based on the updated query and update the query based on the updated first word cloud, the search platform module is to execute the updated query and provide data from second records in the database determined to include data most similar to the updated first word cloud based on the executed updated query, and the application server module is further to create updated second word clouds using the data from the second records, determine a similarity value indicating how similar the updated first word cloud is to each of the updated second word clouds, and provide a similarity indicator to the user interface that indicates how similar a particular record of the second records is to the data received at the user interface module.

Example 4 can include or use, or can optionally be combined with the subject matter of Example 2, to include or use, wherein the structured data includes data corresponding to user responses to a plurality of the predefined prompts and the unstructured data includes only data corresponding to the user's responses to the plurality of prompts.

Example 5 can include or use, or can optionally be combined with the subject matter of Example 4, to include or use, wherein the records previously filled out through the user interface module include records of the same type as the first record and records of a different type as the first record.

Example 6 can include or use, or can optionally be combined with the subject matter of at least one of Examples 1-6, to include or use, wherein the first and second word clouds include a term frequency tag for each word of a subset of the words in the unstructured text that indicates the number of times the word appears in the unstructured text.

Example 7 can include or use, or can optionally be combined with the subject matter of Example 6, to include or use, wherein the search platform module is to determine a score for each record and the specified number of records include the records determined to include highest relative scores.

Example 8 can include or use, or can optionally be combined with the subject matter of Example 7, to include or use, wherein the search platform module is to determine the score for each record based on two or more of a term frequency, inverse document frequency, a coordination factor, a length normalization, and a query clause boost factor.

Example 9 can include or use, or can optionally be combined with the subject matter of Example 8, to include or use, wherein the search platform module is to set the query clause boost factor associated with a word in the query based on the value of the term frequency tag relative to values of term frequency tags associated with other words in the first word cloud.

Example 10 can include or use, or can optionally be combined with the subject matter of at least one of Examples 1-9, to include or use, wherein the structured data corresponds to Hypertext Markup Language (HTML) data from the user interface module and the unstructured data includes text of an HTML element without one or more associated HTML tags.

Example 11 can include or use subject matter (such as an apparatus, a method, a means for performing operations, or a machine readable memory including instructions that, when performed by the machine, can configure the machine to perform acts), such as can include or use a method for unstructured text analysis comprising deconstructing structured data to create unstructured text, creating, using an application server, a first word cloud using the unstructured text, creating, using the application server, a query based on the first word cloud, receiving data corresponding to contents of a specified number of records determined to include data most similar to the first word cloud in a database of records, creating a second word cloud for each of the specified number of records using the data from the specified number of records, determining similarity values indicating how similar the first word cloud is to each of the second word clouds, and providing a similarity indicator for each record of the specified number of records to a user interface, the similarity indicator representing a relative magnitude of the determined similarity values of the specified number of records.

Example 12 can include or use, or can optionally be combined with the subject matter of Example 11, to include or use, wherein the method further comprises structured data includes a user's respective responses to predefined prompts, the unstructured text consists of one or more of the respective responses.

Example 13 can include or use, or can optionally be combined with the subject matter of Example 12, to include or use, receiving, at a user interface communicatively coupled to the application server, a response to a predefined prompt in response to a user completing the response, wherein the unstructured text includes text representative of the response, updating the first word cloud based on the received response, updating the query based on the updated first word cloud, executing the updated query, providing data from second records in the database determined to include data most similar to the updated first word cloud based on the executed updated query, creating updated second word clouds for each of the second records using the contents of the second records, determining a similarity value indicating how similar the updated first word cloud is to the updated second word cloud, and providing updated similarity indicators to the user interface that indicates how similar a particular record of the second records is to the text received at the user interface.

Example 14 can include or use, or can optionally be combined with the subject matter of at least one of Examples 11-13, to include or use, determining a score for each of the second records returned from the query and providing the specified number of records determined to include highest relative scores.

Example 15 can include or use, or can optionally be combined with the subject matter of Example 14, to include or use setting a query clause boost factor associated with a word in the query based on a relative value of the term frequency tag to values of term frequency tags associated with other words in the first word cloud.

Example 16 can include or use subject matter (such as an apparatus, a method, a means for performing operations, or a machine readable storage device including instructions that, when performed by the machine, can configure the machine to perform operations), such as can include or use 16. A machine readable storage device including instructions stored thereon which, when executed by a machine, cause the machine to perform operations for unstructured text analysis comprising creating a first word cloud using unstructured text, creating a query based on the first word cloud, receiving data corresponding to the contents of a specified number of records determined to include data most similar to the first word cloud in a database of records, creating second word clouds using the data from the specified number of records, determining similarity values indicating how similar the first word cloud is to each of the second word clouds, and providing a similarity indicator for each record of the specified number of records to a user interface, the similarity indicator representing a relative magnitude of the determined similarity values of the specified number of records.

Example 17 can include or use, or can optionally be combined with the subject matter of Example 16, to include or use, wherein the structured data includes a user's respective responses to predefined prompts and the unstructured text consists of one or more of the respective responses.

Example 18 can include or use, or can optionally be combined with the subject matter of Example 17, to include or use instructions which, when executed by the machine, cause the machine to perform operations comprising receiving a response to a predefined prompt in response to a user completing the response, updating the first word cloud based on the received response, updating the query based on the updated first word cloud, executing the updated query, receiving data from second records in the database determined to include data most similar to the updated first word cloud based on the executed updated query, creating an updated second word cloud using the data from the second records, determining a similarity value indicating how similar the updated first word cloud is to the updated second word cloud, and providing an updated similarity indicator to the user interface that indicates how similar a particular record of the second records is to the text received at the user interface.

Example 19 can include or use, or can optionally be combined with the subject matter of at least one of Examples 16-18, to include or use instructions stored thereon which, when executed by the machine, cause the machine to perform operations comprising determining a score for each record returned from the query and providing the specified number of records determined to include highest relative scores.

Example 20 can include or use, or can optionally be combined with the subject matter of Example 19, to include or use instructions stored thereon which, when executed by the machine, cause the machine to perform operations comprising setting a query clause boost factor associated with a word in the query based on a value of a term frequency tag of the word in the first word cloud relative to values of term frequency tags associated with other words in the first word cloud.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system to perform unstructured text analysis comprising:
   processing circuitry communicatively coupled to a memory, the memory including instructions stored thereon which, when executed by processing circuitry, cause the processing circuitry to implement modules comprising:
   a user interface module to receive, through a user interface, structured data and deconstruct the structured data to create unstructured text, the structured data comprising user responses input into respective predefined prompts on the user interface and metadata for each response of the user responses, the unstructured text comprising only text corresponding to the user responses input into the respective predefined prompts;
   an application server module to receive the unstructured text, create a first word cloud using only the unstructured text, create a query based on the first word cloud, and create a boosted query by increasing a weight of a word in the query based on the metadata;
   a search platform module to execute the boosted query on a database, analyze a specified number of records returned from executing the boosted query, and provide data from the specified number of records determined to include data most similar to the first word cloud based on the boosted query; and
   wherein the application server module is further to create a plurality of second word clouds, one second word cloud for each of the specified number of records, determine a similarity value indicating how similar the first word cloud is to each of the second word clouds, and provide a similarity indicator to the user interface that indicates how similar a particular record of the specified number of records is to the text received at the user interface based on the determined similarity value.

2. The system of claim 1, wherein the user interface module provides a user a view of a first record to be populated using a user's respective responses to the predefined prompts, the unstructured text consists of one or more entered respective responses, and the records include records previously populated using the user interface module.

3. The system of claim 2, wherein:
   the user interface module is to deconstruct the structured data in response to the user completing a response to a predefined prompt of the respective predefined prompts and provide the unstructured text in response to deconstructing the structured data;
   the application server module is further to update the first word cloud based on the user response to the predefined prompt and update the query based on the updated first word cloud;
   the search platform module is to execute the updated query and provide first data from second records in the database determined to include second data most similar to the updated first word cloud based on the executed updated query; and
   the application server module is further to create updated second word clouds using the first data from the second records, determine a similarity value indicating how similar the updated first word cloud is to each of the updated second word clouds, and provide a similarity indicator to the user interface that indicates how similar a particular record of the second records is to the data received at the user interface module.

4. The system of claim 3, wherein the structured data includes data corresponding to user responses to a plurality of the predefined prompts and the unstructured text includes only data corresponding to the user's responses to the plurality of prompts, wherein the predefined prompts include a resolution of an issue and one or more of a description of a product defect, a manufacturing error, a part defect, and a customer complaint.

5. The system of claim 4, wherein the records previously filled out through the user interface module include records of the same type as the first record and records of a different type as the first record.

6. The system of claim 1, wherein the first and second word clouds include a term frequency tag for each word of a subset of the words in the unstructured text that indicates the number of times the word appears in the unstructured text, a value of a weight of a word is higher for a word that appears less frequently than for a word that appears more frequently.

7. The system of claim 6, wherein the search platform module is to determine a score for each record and the specified number of records include the records determined to include highest relative scores.

8. The system of claim 7, wherein the search platform module is to determine the score for each record based on an inverse document frequency and one or more of a coordination factor, a length normalization, and a query clause boost factor provided by the user.

9. The system of claim 8, wherein the search platform module is to set the query clause boost factor associated with a word in the query based on the value of the term frequency tag relative to values of term frequency tags associated with other words in the first word cloud.

10. The system of claim 1, wherein the structured data corresponds to Hypertext Markup Language (HTML) data from the user interface module and the unstructured data includes text of an HTML element without one or more associated HTML tags.

11. A method for unstructured text analysis comprising:
deconstructing structured data provided through a user interface to create unstructured text, the structured data comprising user responses input into respective predefined prompts on the user interface and metadata for each response of the user responses, the unstructured text comprising only text corresponding to the user responses input into the respective predefined prompts;
creating, using an application server, a first word cloud using only the unstructured text;
creating, using the application server, a query based on the first word cloud;
creating a boosted query by increasing a weight of a word in the query based on the metadata;
receiving, in response to issuing the boosted query, data corresponding to contents of a specified number of records determined to include data most similar to the first word cloud in a database of records, the database of records including records of product defects, customer complaints, and part defects;
creating a second word cloud for each of the specified number of records using the data from the specified number of records;
determining similarity values indicating how similar the first word cloud is to each of the second word clouds; and
providing a similarity indicator for each record of the specified number of records to a user interface, the similarity indicator representing a relative magnitude of the determined similarity values of the specified number of records.

12. The method of claim 11, further comprising receiving, at a user interface communicatively coupled to the application server, a response to a predefined prompt in response to a user completing the response, wherein the unstructured text includes text representative of the response:
updating the first word cloud based on the received response;
updating the query based on the updated first word cloud;
executing the updated query;
providing data from second records in the database determined to include data most similar to the updated first word cloud based on the executed updated query;
creating updated second word clouds for each of the second records using the contents of the second records;
determining a similarity value indicating how similar the updated first word cloud is to the updated second word cloud; and
providing updated similarity indicators to the user interface that indicates how similar a particular record of the second records is to the text received at the user interface.

13. The method of claim 11, further comprising determining a score for each of the records returned from the boosted query and providing the specified number of records determined to include highest relative scores.

14. The method of claim 13, further comprising setting a query clause boost factor associated with a word in the query based on a relative value of a term frequency tag to values of term frequency tags associated with other words in the first word cloud, a value of the query clause boost factor is higher for a word that appears less frequently than for a word that appears more frequently.

15. A machine-readable storage device including instructions stored thereon which, when executed by a machine, cause the machine to perform operations for unstructured text analysis, the operations comprising:
creating a first word cloud using only unstructured text of structured data provided by a user through a user interface, the structured data comprising user responses input into respective predefined prompts on the user interface and metadata for each response of the user responses, the unstructured text comprising only text corresponding to the user responses input into the respective predefined prompts;
creating a query based on the first word cloud;
creating a boosted query by increasing a weight of a word in the query based on the metadata;
receiving, in response to issuing the boosted query, data corresponding to the contents of a specified number of records determined to include data most similar to the first word cloud in a database of records;
creating second word clouds using the data from the specified number of records;
determining similarity values indicating how similar the first word cloud is to each of the second word clouds; and
providing a similarity indicator for each record of the specified number of records to a user interface, the similarity indicator representing a relative magnitude of the determined similarity values of the specified number of records.

16. The machine-readable storage device of claim 15, further comprising instructions which, when executed by the machine, cause the machine to perform operations comprising receiving a response to a predefined prompt of the predefined prompts in response to a user completing the response:
updating the first word cloud based on the received response;

updating the query based on the updated first word cloud;
executing the updated query;
receiving data from second records in the database determined to include data most similar to the updated first word cloud based on the executed updated query;
creating an updated second word cloud using the data from the second records;
determining a similarity value indicating how similar the updated first word cloud is to the updated second word cloud; and
providing an updated similarity indicator to the user interface that indicates how similar a particular record of the second records is to the text received at the user interface.

17. The machine-readable storage device of claim 15, further comprising instructions stored thereon which, when executed by the machine, cause the machine to perform operations comprising determining a score for each record returned from the boosted query and providing the specified number of records determined to include highest relative scores.

18. The machine-readable storage device of claim 17, further comprising instructions stored thereon which, when executed by the machine, cause the machine to perform operations comprising setting a query clause boost factor associated with a word in the query based on a value of a term frequency tag of the word in the first word cloud relative to values of term frequency tags associated with other words in the first word cloud, a value of the query clause boost factor is higher for a word that appears less frequently than for a word that appears more frequently.

* * * * *

UNITED STATES PATENT AND TRADEMARK OFFICE
CERTIFICATE OF CORRECTION

| | | |
|---|---|---|
| PATENT NO. | : 10,176,251 B2 | Page 1 of 1 |
| APPLICATION NO. | : 14/840192 | |
| DATED | : January 8, 2019 | |
| INVENTOR(S) | : Boule et al. | |

It is certified that error appears in the above-identified patent and that said Letters Patent is hereby corrected as shown below:

In the Specification

Column 4, Line 51, delete "frequency (ies)," and insert --frequency(ies),-- therefor In the Claims Column 14, Line 2, in Claim 12, delete "response:" and insert --response;-- therefor Column 14, Line 65, in Claim 16, delete "response:" and insert --response;-- therefor Signed and Sealed this
Twenty-first Day of April, 2020

Andrei Iancu
*Director of the United States Patent and Trademark Office*